…

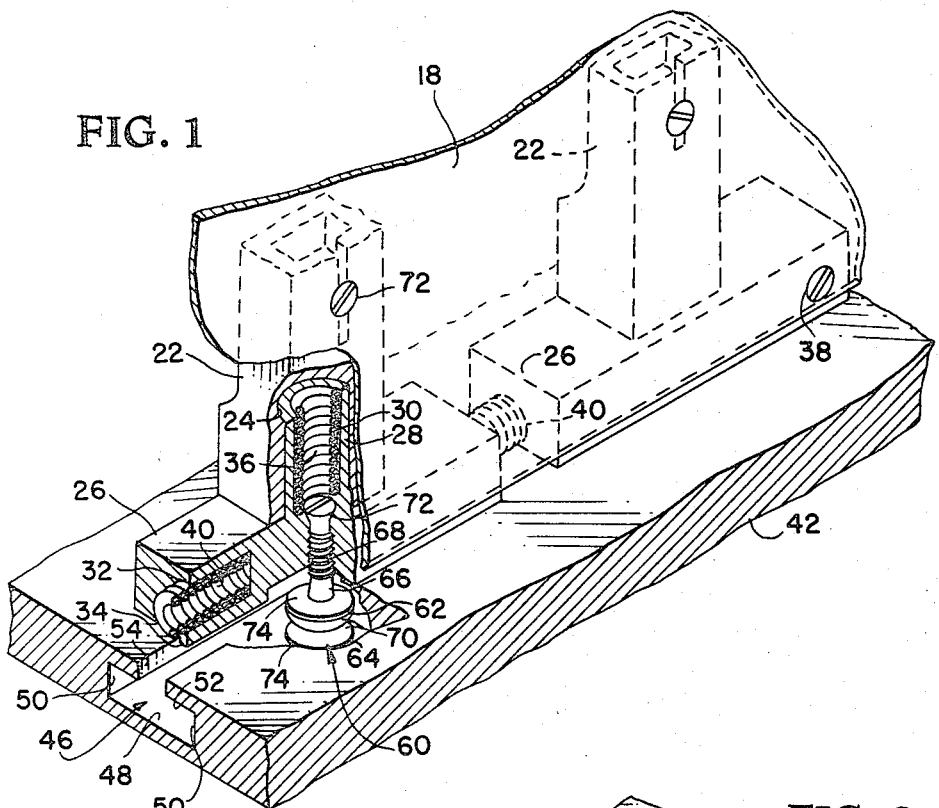

United States Patent Office 3,416,274
Patented Dec. 17, 1968

3,416,274
FLEXIBLY CONNECTED SUPPORT AND SKIN
James E. Webb, Administrator of the National Aeronautics and Space Administration, with respect to an invention of William O. Leffke, Tonawanda, N.Y.
Filed Oct. 8, 1965, Ser. No. 494,283
6 Claims. (Cl. 52—272)

ABSTRACT OF THE DISCLOSURE

An arrangement for fastening a skin to a frame allowing resilient and sliding movement of the skin relative to the frame along one or more axes so as to allow thermally induced expansionary and contractionary movements along these axes.

---

The invention described herein may be manufactured and used by or for the Government of the United States of America for governmental purposes without the payment of any royalties thereon or therefor.

This invention relates generally to a fastener device and more particularly to a resilient fastener for attachment of the skin of aerospace vehicles, allowing resilient and sliding movement of the skin relative to a mounting framework to provide for thermally induced expansionary and contractionary movements along several axes.

The advent of high speed aircraft and aerospace vehicles presents varied problems regarding the structural requirements for these bodies. For example, aerospace vehicles encounter a variety of environmental conditions varying from extreme cold to very high temperatures. Such circumstances necessarily cause varying degrees of expansion and contraction of the materials from which the vehicles are constructed. The skin structures are generally of thin material that is of little value from a structural viewpoint. Such a characteristic requires that the devices utilized for mounting the skin structure on the framework of the aerospace vehicle be something more than rivets or screws. Devices, such as screws, bolts and rivets, have been developed for securing a skin to a framework where there were no rapid variations in size of the skin or connected members. The more complicated devices generally have large bearing surfaces and the attendant friction involved therewith. U.S. Patent No. 2,948,316, dated Aug. 9, 1960, for an Anchor Nut Assembly for Minimizing Heat Transfer, is an example of these devices. Further, these devices involve large cross-sectional areas of thermal conductive material which would convey the temperature outside the skin to the interior framework and space. Quite obviously, the large variations in temperatures are unsuitable for a human environment. Thus, it becomes necessary to prevent heat transfer by conduction while permitting the skin element to expand and contract freely to prevent extreme thermal stresses and buckling which would tend to fatigue the skin materials.

In order to overcome the disadvantages of the prior art, the instant invention contemplates uilization of opposed elements resiliently separated and located within a slot and having provision for rigid attachment of the skin to the innermost opposed element. The slot is located in the framework to permit the skin to slide in the slot as well as expand away from the support as necessary.

It is an object of the instant invention to provide an assembly for maintaining the shape and structural integrity of an aerospace vehicle.

Another object of this invention is to provide an assembly employing an isothermal skin that prevents excessive thermal stresses and accommodates normal variations in critical dimensions.

A further obejct of the instant invention is to provide insulation of contacting surfaces through use of a low thermal conductive solid as a lubricating film between a framework and a novel fastener that offers minimum resistance to sliding.

Another object of this invention is to provide a fastener for securing the skin to the framework of an aerospace vehicle while permitting resilience in at least two directions.

A further object of the instant invention is to provide a fastener having Belleville washers resiliently separating opposed elements that slide in a T-slot in a rib with the skin rigidly attached to the opposed element which slides on the bottom of the slot.

A still further object of the instant invention is to provide an assembly wherein a base has a T-slot for slides, one opposed element of which is connected to a support resiliently connected to a rib which also has a T-slot for receiving slides attached to the skin.

Summary of the disclosure

Generally, the foregoing and other objects are accomplished by providing an inverted T-slot in a base member which receives a fastener having opposed elements resiliently separated to bear against the top and bottom of the slot. The opposed element contacting the bottom of the slot functions as a nut for receiving a screw or bolt which secures the skin in place. The above construction may be resiliently attached to supports which are secured to a base or framework by a similar fastener construction and which are resiliently separated from one another to thereby provide an assembly having essentially one point of fixity.

A more complete appreciation of the invention and many of the attendant advantages thereof will be readily apparent as the same becomes better understood by reference to the following description when considered in connection with the accompanying drawings wherein:

FIG. 1 is an isometric view, with portions omitted for clarity, of a portion of an assembly employing the instant invention;

FIG. 2 is an end elevational view of the construction of FIGS. 1 and 3; and

FIG. 3 is an isometric view, with portions omitted for clarity ,of one embodiment of the instant invention.

Referring now to the drawing and more particularly to FIGS. 1 and 3 wherein an assembly, such for example as an aerospace vehicle, embodying the instant invention is shown. Skin 18 is resiliently attached by fastener 20 to rib 22 having bore 24 in the end thereof. Skin 18 is secured to supports 26 at least at one point by conventional means such as screw 38. Projections 28 are preferably monolithic with and extend upwardly from supports 26 and are of hollow or tubular construction sized to fit within bore 24. The interior opening 30 of projection 28 extends downwardly to a threaded portion extending inwardly from the bottom of support 26. Spring 36 fits within projection 28 with one end abutting the bottom of bore 24 and the other end resting on fastener 60, to be described more fully hereinafter. Thus, a resiliency exists between rib 22 and support 26 which permits relief of forces in the plane of rib 22 to prevent damage to skin 18.

In the assembly of FIGS. 2 and 3 each support 26, excepting the end supports, is provided with bores 32 at each end thereof and may have a single or plurality of keys 34 for guiding the movement of support 26. Springs 40 fit into bores 32 with a portion of each spring extending into the respective bores of adjacent supports 26. Alternatively, supports 26 could be provided with bores 32 in only one end so that springs 40 would project from bores 32 to bear against the end of the adjacent support 26. Either construction provides a resiliency between the supports which permits maintenance of constant forces that compensate for any expansion or contraction of skin 18 along the line of supports 26.

Framework or base 42 has an elongated inverted T-shaped slot 46 having bottom 48 and sides 50 that extend toward the edge of base 42 from bottom 48. A lip is formed by top 52 and lateral edges 54 of slots 46. Lateral edges 54 are spaced to permit key 34 on support 26 to slide therealong. Although slot 46 is shown to be of inverted T-shape, it is to be understood that other types of slots, such as dovetail groove, could be utilized.

Slide or fastener 60 includes opposed elements such as backup washer 62 and nut 64 which has shank 66 extending upwardly to interfit bore 30 of support 26. Washer 62 is dimensioned to fit over shank 66 and slide thereon in response to the forces acting on Belleville washers 70 which resiliently separate opposed elements 62 and 64. Shank 66 may be provided with internal threads for receiving bolt 72 in order to secure support 26 to nut 64. Shank 66 also may have external threads 68 to assist in securing support 26 to nut 64. In the latter situation, the threads in bore 30 would be compatible with threads 68 and thus insure a rigid conection therebetween. Each of the faces of opposed elements 62 and 64 that contact top 52, sides 50 and bottom 48 of slot 46 is coated with friction-reducing material 74, such for example as Teflon. Such a coating insures a substantially frictionless sliding engagement between fastener 60 and slot 46.

Referring now to FIG. 3 wherein skin fastener 20 is shown as being constructed substantially similar to slide 60. Rib 22 is provided with slot 46 which is substantially identical to slot 46 in base 42. That is, slot 46 may be of inverted T or dovetail shape. Opposed elements, such as backup washer 62 and nut 64, are resiliently separated by Belleville washers 70. Nut 64 includes shank 66 extending upwardly through the space between lateral edges 54 of slot 46 and may be internally threaded to receive screw 72 which rigidly secures skin 18 to nut 64. Again the surfaces of opposed elements 62 and 64 that contact the surfaces of slot 46 are coated with Teflon or an equivalent type of friction reducing and insulating material.

As seen in FIG. 3, skin 18 is substantially rigidly secured to nut 64 which would infer a rigid connection between rib 22 and skin 18. However, Belleville washers 70 resiliently support nut 64 and backup washer 62 in slot 46. Thus, fastener 20 is permitted longitudinal sliding movement in slot 46 while lateral movement is prevented by the edges of opposed elements 62 and 64 encountering sides 50 of slot 46. Also, shank or projection 66 on nut 64 may be coated with Teflon in order to permit it to slide between lateral edges 54 and thereby assist in preventing lateral movement of fastener 20 in slot 46. Thus, it is seen that varying environmental conditions are overcome by permitting skin 18 to move along slot 46 as well as permitting skin 18 to expand or contract toward or away from rib 22 because of the resilience of Belleville washers 70.

In the overall construction of FIGS. 1–3, slides 60 or fasteners 20 are located in slot 46 by insertion thereinto at one end, and supports 26 are positioned with bores 30 receiving shank 66 extending from nut 64. Screw 72 rigidly secures support 26 to nut 64. Springs 40 are inserted in end bores 32 and a succeeding support 26 positioned with its slide 60 securely attached thereto and key 34 in slot 46. Upright spring 36 is inserted into bore 30 and extends out of projection 28 to put a separating force on rib 22 which is inserted over projection 28 that fits within bore 24. Proper selection of spring 36, because of the loose interfitting of projection 28 in bore 24, permits rib 22 to expand or contract depending on environmental conditions and thereby maintain a constant relationship providing a minimum of external forces acting on skin 18. Skin 18 is secured to rib 22 by fasteners 20 substantially in the manner slides 60 are utilized in connecting supports 26 and base 42.

The relatively small thermal cross section of fasteners 20 and 60 prevents substantial conduction of heat between skin 18, rib 22 and base 42. The characteristics of a material such as Teflon are advantageous in that they act as a thermal insulation as well as a friction-reducing agent to thereby provide a fastening element free to move in slot 46 and thermally insulate base 42 from support 26 and rib 22. Although key 34 interfits lateral edges 54 of slot 46 and thereby has surface-to-surface contact with base 42, this contact is insignificant in regard to conduction of heat from skin 18, especially if coated with Teflon or a material having similar characteristics.

In view of the above, it is readily apparent that the instant invention provides a novel fastener permitting assembly of an aerospace vehicle that maintains the shape and structural integrity thereof while preventing excessive thermal stresses and accommodating normal variations in critical dimensions. The instant inventive fastener permits two directional freedom of movement for a skin structure while insulating the skin from the framework. Further, the resiliency between the supports and the ribs and supports, permits expansion and contraction of the structure which prevents the skin from being subjected to damaging stresses.

Obviously, many modifications and variations of the subject invention are possible in the light of the above teachings. It is therefore to be understood that within the scope of the appended claims the invention may be practiced otherwise than as specifically described.

What is claimed is new and desired to be secured by Letters Patent of the United States is:

1. In an assembly employing an isothermal skin structure, the combination comprising: a base for support of the structure; at least one support; means connecting said base and said support allowing free-sliding relative movement in one direction while resiliently securing said rib to said support in another direction; at least one rib; means providing a resilient connection between said rib and said support; a skin; means connecting said rib and said skin allowing free-sliding relative movement in one direction while resiliently securing said support in another direction; whereby subjection of the structure to varying pressures and temperatures will not cause undue restraint or thermal stresses of the skin due to the attachments maintaining uniform pressure for overcoming integrated pressure loads and preventing local skin flutter.

2. In an assembly employing an isothermal skin, the combination comprising: a base for support of the assembly and having at least one slot therein; a plurality of resilient and slidable first fasteners interfitting said slot; a plurality of supports secured to said fasteners; resilient means between said supports; a plurality of ribs resiliently attached to said supports and having a slot therein; a plurality of resilient and slidable second fasteners interfitting said slot in said ribs; and an isothermal skin secured to said second fasteners and at least one of said supports, whereby the assembly has essentially one point of fixity so increases of temeprature or pressure that cause expansion of the skin are prevented from overstressing the skin because said resilient means are in compression and tend to separate said supports from one another and said ribs from said supports and said fasteners permit adjacent members to slide upon one another.

3. The assembly of claim 2 wherein said resilient means comprise springs between said supports; and said first and second fasteners comprise: nut means for slidably interfitting said slots and having a threaded shank extending from said slots; backup washer means interfitting said slots and slidably engaging said shank; Belleville washer means between said nut means and backup washer means to provide a resilient connection therebetween and cause said nut means and backup washer means to engage opposed surfaces of said slots; and screw means for securing said supports to said first fasteners and said skin to said second fasteners.

4. The assembly of claim 2 wherein said slots in said base and said ribs are T-shaped.

5. The assembly of claim 4 wherein said supports have key means interfitting said slots for guiding the movement of said supports along said base.

6. In a space vehicle, the combination comprising: a framework for support of the vehicle structure; elongated slots in said framework; slide elements slidably mounted in said slot and having a threaded projection extending therefrom; backup washers overlying each of said projections and disposed in said slots; resilient means extending between said slide elements and said backup washers for a resilient interfitting thereof with said slot; a skin for attachment to said framework; and screw means passing through said skin and threadingly engaging said projection for rigidly connecting said skin to said slide elements.

References Cited

UNITED STATES PATENTS

| | | | |
|---|---|---|---|
| 174,846 | 3/1876 | Parker | 85—4 X |
| 1,872,014 | 8/1932 | Schjolin | 85—4 X |
| 2,223,215 | 11/1940 | Kunz et al. | 52—573 X |
| 2,656,902 | 10/1953 | Gotshall | 52—573 X |
| 2,737,268 | 3/1956 | Smith | 287—189.36 |
| 2,922,456 | 1/1960 | Kann | 151—41.7 X |
| 2,936,805 | 5/1960 | Rice | 151—38 |
| 2,948,316 | 8/1960 | Sing et al. | 151—41.7 |
| 3,093,346 | 6/1963 | Faget et al. | 244—155 |
| 3,318,622 | 5/1967 | Crumpler | 151—41.7 X |
| 3,324,615 | 6/1967 | Zinn | 52—364 X |
| 99,473 | 2/1870 | Pratt | 151—38 |
| 1,610,578 | 12/1926 | Murphy | 52—402 |
| 2,659,953 | 11/1953 | Woolsey | 151—38 X |
| 3,295,280 | 1/1967 | Kettner | 52—573 |

HENRY C. SUTHERLAND, *Primary Examiner.*

U.S. Cl. X.R.

52—86, 483, 573; 151—41.7